Jan. 10, 1939.  J. L. BARR  2,143,184
DEVICE FOR FACILITATING MOVEMENT OF STEERING WHEELS
Original Filed May 29, 1934  5 Sheets-Sheet 1

Inventor
JOHN L. BARR
By Semmes & Semmes
Attorneys

Patented Jan. 10, 1939

2,143,184

UNITED STATES PATENT OFFICE 2,143,184

DEVICE FOR FACILITATING MOVEMENT OF STEERING WHEELS

John L. Barr, Chevy Chase, Md.

Application May 29, 1934, Serial No. 728,187
Renewed April 21, 1937

5 Claims. (Cl. 280—150)

My invention relates to means for relieving the weight on at least one of the steering wheels of a vehicle so that the steering wheels may be more easily turned.

This application comprises means for lifting a portion of the vehicle by reason of power applied which is extraneous of the movement of the vehicle. In other forms of device which I have invented, there has been a compression element upon which the vehicle has moved either by forward or backward movement of the vehicle. The present invention, however, contemplates the use either of manual power or mechanical power of some sort on the vehicle for accomplishing the lifting effect.

An important feature of my invention is the caster type of foot on the compression element which permits the necessary motion of the device when the wheels are in cramped position. While this device may be located in the center of the car, it is contemplated that the device will be placed nearer one of the steering wheels than the other, preferably the left front wheel, and will relieve the weight on that steering wheel. While the device is in operative position, the car will be driven back and forth in the parking or turning operations, the caster wheel relieving the weight on one of the steering wheels and making it more easy to turn them.

It is an object of this invention to have a lift device which will be in place throughout the turning operations and will permit the car to be driven back and forth without necessitating that the car be balanced on the device.

Another object of the invention is to make the operation of a steering assisting device more positive and less subject to the skill of the operator.

A still further object of the invention is to provide a strong sturdy construction which is easy to repair and replace, and which can be readily and cheaply manufactured, and yet possesses qualities that make it strong and durable, and positive in operation.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompany drawings means for carrying the same into practical effect without limiting the improvements in their useful applications to the particular constructions, which, for the purpose of explanation, have been made the subject of illustration.

Referring to the drawings, I have shown an automobile having front steering wheels 1 and a front axle 2. The frame of the car I have indicated by the numeral 3 and the framework of the car is suspended by the usual spring construction 4 on the front axle 2. The usual steering mechanism is shown. The tie-rod I have indicated by the numeral 5. Attached to the side frame of the car 3, by bolts or rivets 6, is a lever support member 7 provided with notches 8.

On the lever support member 7, at 9, is pivoted a lever 10 provided with a handle 11. The lever 10 has a release grip 12 which is pivoted at 13 on the lever. On the release grip at 14 is attached an operating rod 15 of the usual construction which is adapted to slide in a sleeve 16 and to engage at its lower end notches 8 in the support member 7. This construction is the usual type and I do not consider it patentable except in combination with the other features of my invention to be described. The lever 10 is provided with an arm 17 and another arm 18. The arm 17 is provided with a pivot 19 and the arm 18 with a pivot 21. The pivot 19 is adapted to slide in a lost motion linkage 22 provided at the end of the operating rod 23. The pivot 21 slides in a lost motion linkage 24 provided at the end of an operating rod 25.

A compression element for elevating a portion of the vehicle comprises an operating rod 23 which forms a lever. It is extended to the point 26 and branches at that point, having an arm 27 and another arm 28, all of which may be integrally formed in the member 23. These are bent downwardly at the points 29, and bent again at the points 31, and are continued forward and pivoted at the points 32 below the front axle 2. The front axle 2 is provided with a support member 33 which carries a pivot member 34 which passes through the lever 23 at the points 32.

The operating rod 25 is pivoted at 35 to an arm 36 of a bell crank lever which is pivoted at 37 on a pivot which passes through both bifurcations 27 and 28 of the lever 23. The bell crank lever has another arm 38 which may be bifurcated and is provided with a stop member 39 at its end. Pivoted at 41 between the bifurcations of the arm 38 of the bell crank lever is a link 42. The lower end of the link 42 is pivoted at 43 to a leg 44 which is of sturdy construction and may be provided with a strengthening web 45. The leg 44 is pivoted at 46 between the bifurcated members 27 and 28 of the lever 23. On the bottom of the leg 44 I have provided a caster construction 47 which is pivoted on a revoluble thrust bearing 48 which carries the usual caster type foot, which may preferably carry a pneumatic tire.

Figures 4, 5, 6:
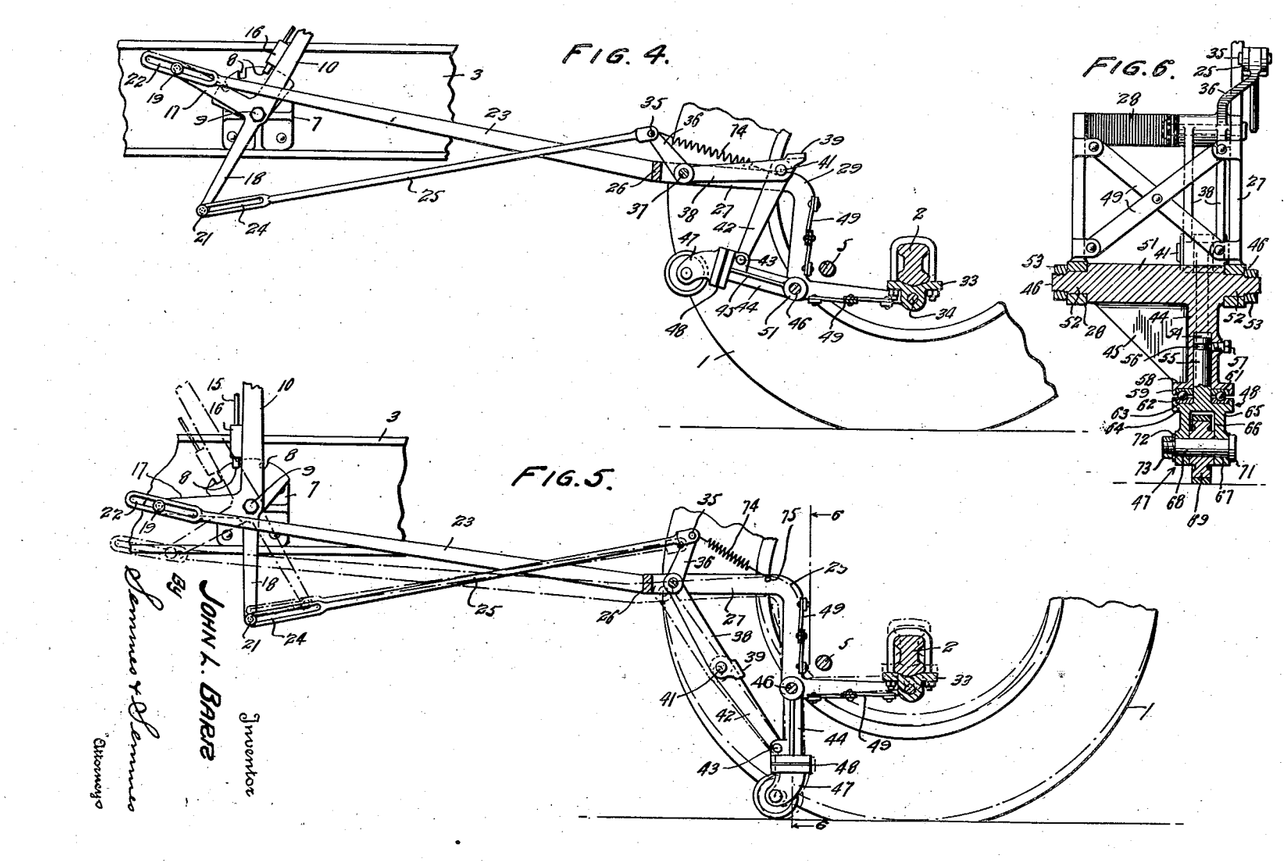
Figure 4 is a detail side elevation of my device in the inoperative position.
Figure 5 is a detail side elevation of my device in the operative position, the movement of the parts being indicated in dotted lines.
Figure 6 is a view along the line 6—6 of Figure 5.

The detail of this caster mechanism is shown particularly in Figure 6. The bifurcated members 27 and 28 are shown as braced by bracing members 49 which are suitably attached to the members 27 and 28. The leg 44 is shown provided with a pivot bar 51 which may be integrally formed with the leg 44 and with the strengthening web 45. The pivot member is pivoted, as before stated, at 46 in the bifurcated members 27 and 28. The pivot member 51 has reduced portions 52 which pass through apertures in the members 27 and 28. The pivot member 51 is held in position by nuts 53 which may be of the lock nut type.

The leg 44 is provided with a central aperture 54 in which is rotatably mounted a shaft 55 provided with an annular groove 56 in its upper end into which is adapted to extend a bolt 57 which passes through the leg 44 and prevents the shaft 55 from falling out of the aperture 54 when the device is raised from the ground. The leg 44 is provided with an extended base 58 having a downturned annular flange 59.

An annular ball race 61 fits within the flange 59. In the ball race 61 are adapted to travel anti-friction balls 62. A lower ball race 63 fits within a cup-like depression 64 formed in the upper part of a caster casting 65 which may be integrally formed with a shaft 55. The caster casting 65 is bifurcated, as indicated at 66, and is provided with apertures at 67. Through the apertures 67 pass a shaft 68 upon which is journalled a caster wheel 69. The shaft 68 is provided with a head 71 and is held in place at the other side of the assembly by means of a washer 72 and a lock nut 73.

The construction just described is a very strong and strain resisting construction, yet the caster arrangement permits the caster wheel to readily take a position such as to align itself with the forces acting upon it when the vehicle is moved with the caster wheel down in contact with the roadway. The principal difficulty in steering wheels lies in the fact that the wheels of vehicles are normally slanted towards each other at the bottom and there is a binding effect when they are attempted to be moved while the vehicle is not traveling either forward or backward. This type of construction is usual in automobiles and is useful since it tends to bring the wheels steady when the vehicle is moving in a straight-line travel. However, when sharp turns must be made when the vehicle is not moving, such as occur in parking and unparking cars in crowded spaces, great difficulty is encountered in turning the steering wheel.

The caster construction, which will relieve the weight at least in part on at least one of the steering wheels, will readily permit the steering wheels to be turned without the binding effect and without the great exertion which is now necessary in turning the steering wheels during parking operations. A tension spring 74 is attached at the pivot 35 and attached at the point 75 on the bifurcation 27 of the lever 23. This spring is of sufficient strength to bring the compression element into the uncollapsed condition, as shown in Figure 5, upon release of the control lever 10.

The operation of this device will now be readily apparent. The hand lever 10 is released from the position it occupies in Figure 4, and the spring 74 contracts, pulling on the arm 36 of the bell crank lever and moving the arm 38 of that lever into the position shown in Figure 5. This brings the compression element into the uncollapsed condition, i. e., one in which the leg 44 projects substantially vertically downwardly approximately in line with the downwardly projecting portions of the bifurcated arms 27 and 28. The position of the leg 44 is indicated in solid lines in Figure 5. The hand lever 10 then occupies the position shown in solid lines in Figure 5. It is then moved backward under the power of the operator in the position shown in dotted lines in Figure 5 and the parts of the mechanism then assume the position shown in dotted lines in that figure.

The following occurs: The lever 23 is moved downwardly into the dotted line position which moves the leg 44 forward, as shown in dotted lines, and raises that side of the chassis so that the weight is largely relieved on the wheel 1, as indicated in dotted lines, the wheel 1 barely touching the roadway. The lost motion linkages permit of this operation without disturbing the uncollapsed condition of the compression element. By manipulation of the hand lever 10, the parts can be brought back into the position shown in Figure 4.

In the form of invention shown in Figures 3 to 11 inclusive, I have shown attached by suitable bolts 81, or some other suitable fastening means, to the frame 3 of the car, a cylinder 82. Within the cylinder, with a fluid tight fit, is a piston 83 which is mounted on the end of a piston rod 84 which slides through a suitable packing gland 85 in the cylinder 82.

The cylinder is provided with ports 86 and 87 which communicate with pipes 88 and 89, respectively. The pipes 88 and 89 are attached, by suitable connections 91 and 92, respectively, to a valve construction 93. The valve construction 93 is provided with ports 94 and 95, and has a cylindrical central aperture 96 in which are adapted to slide two piston members 97. The valve is also provided with ports 98 and a port 99. The port 99 is attached through a suitable fitting 101 to a pipe 102. The pipe 102 is attached through a fitting 103 to the intake manifold 104 of the carburetor of a gasoline engine.

The piston leg members 97 are mounted on a control rod 105 which passes through a cylinder head 106 which is screw-threaded to the valve 93. Between the cylinder head 106 and a holding cap 107, which is screw-threaded to the cylinder head on a projection thereof, is a member indicated at 108. This may be some part of the automobile, for instance the dashboard of the car, and the construction permits of ready mounting of this control member on the dash.

The control rod 105 is provided with a handle 109. The other end of the control rod is adapted to slide in an aperture 111 provided in a cylinder head 112 which is screw-threaded at 113 to the valve body 93. The control rod 105 has a groove 114 which lies opposite an aperture 115 provided in the cylinder head member 112. Adjacent the aperture 115 the cylinder head member 112 is provided with a projection 116 which has an aperture 117 therein in which is housed a spring 118. The spring 118 presses upwardly a ball 119 which, in the position shown in Figure 9, lies within the groove 114 of the control rod 105. This ball and spring construction is adapted to hold the control rod 105 normally in the position shown in Figure 9, at which time both the port 94, which communicates with pipe 88, and the port 95, which communicates with pipe 89, are closed.

Figures 7, 8, 9, 10, 11:
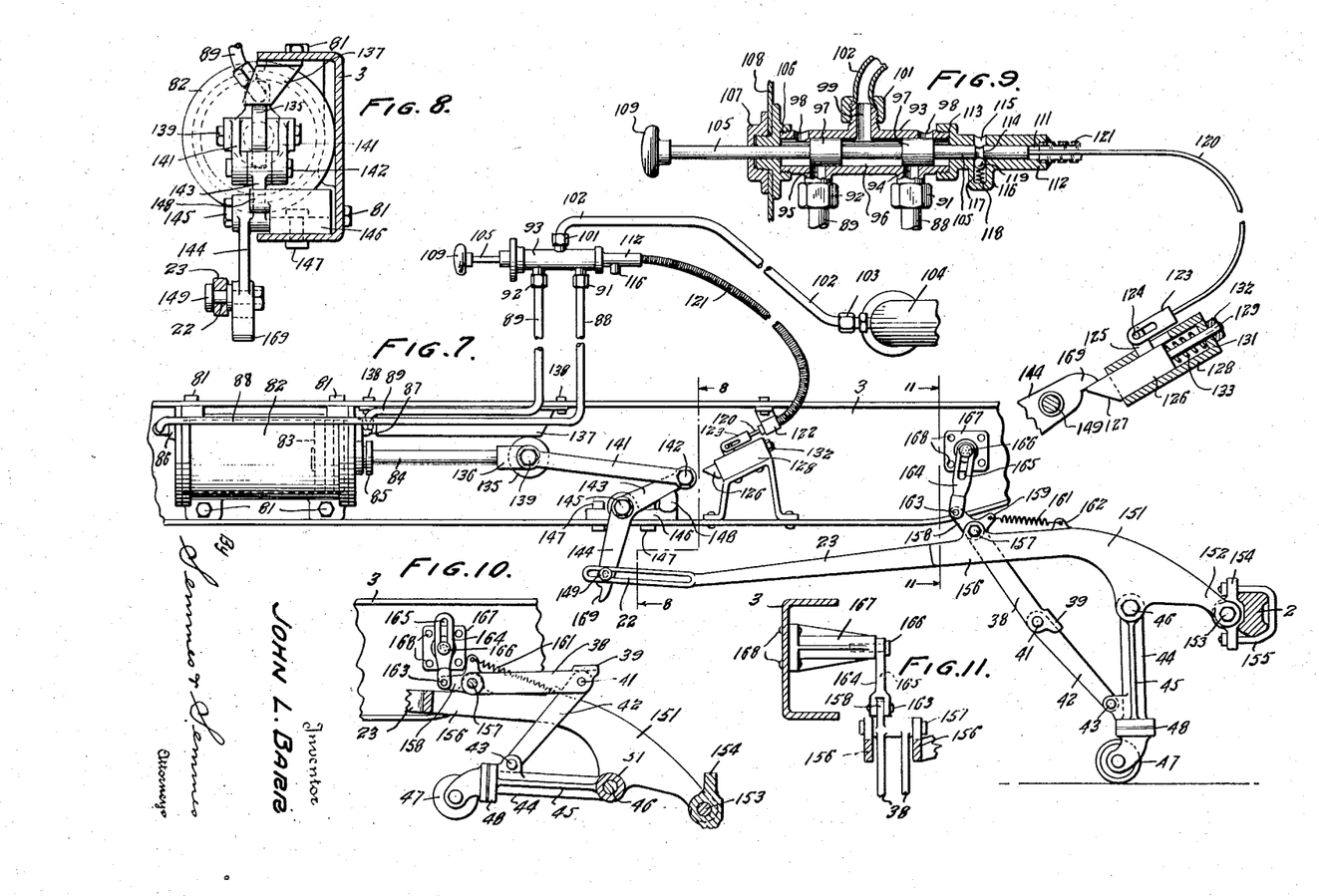
Figure 7 is a side elevation of a modification of my device employing motive power for operation derived from the intake manifold of the car.
Figure 8 is a view taken along the line 8—8 of Figure 7.
Figure 9 is a detail view partly in cross section of the latch and valve control mechanism for the form of invention shown in Figure 7.
Figure 10 is a detail view in side elevation showing my device in the retracted position.
Figure 11 is a view taken along the line 11—11 of Figure 7, looking in the direction of the arrows.
Figures 12, 13:
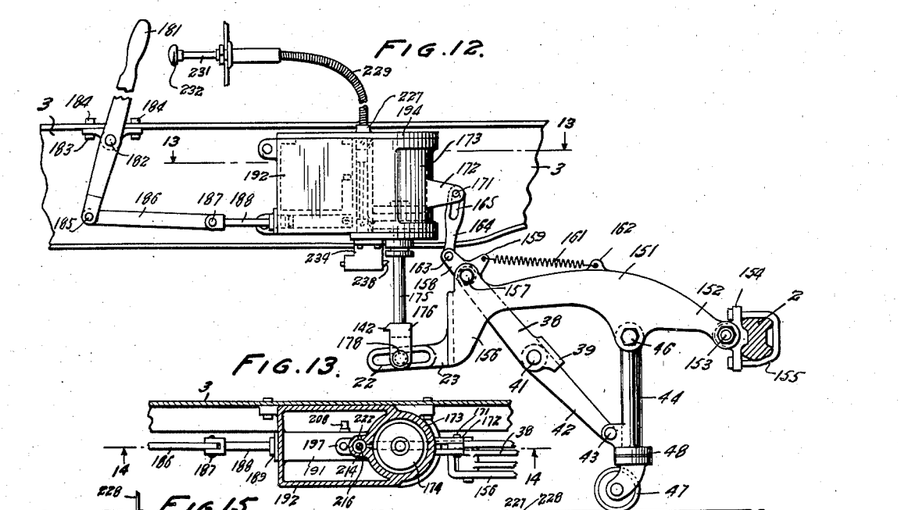
Figure 12 is a view in side elevation of another form of my device using fluid as an operating medium.
Figure 13 is a view taken along the line 13—13 of Figure 12, looking in the direction of the arrows.

With the parts in the position shown in Figure 9, there is a suction in the pipe 102 which communicates with the intake manifold of the engine. However, because the piston head members 97 cover the ports 94 and 95, no suction is produced in the pipes 89 or 88. If the operator pushes on the handle 109 and moves the piston members 97 to the right, the port 94 will be cracked and suction will be produced in pipe 88 which will suck the piston 83 to the left with the parts in the position shown in Figure 7. A contrary movement of the handle 109 will reverse the operation of the valve construction and a suction will be produced in pipe 89 which will tend to move the piston head 83 into the position shown in dotted lines in Figure 7.

It will be noted that in their movement of the piston members 97 communication is established between one of the members 98 and the port which is not in communication with the suction through line 102. This permits atmospheric air to enter the cylinder 82 on the side of the piston 83 which is not subjected to the vacuum, thus permitting the piston 83 to move freely under the influence of the vacuum.

This statement just made is, of course, not scientifically accurate since it is the air pressure that moves the piston 83 and the lack of the balancing pressure on the suction side which causes the piston to move under the atmospheric pressure. It is thought, however, that the operation of the piston 83 in the cylinder 82 under the control of the valve mechanism just described will be readily understood.

There is a latch release mechanism fastened to the end of the operating rod 105 which comprises a Bowden wire 120 which is fastened to the end of the operating rod 105. A Bowden wire casing 121 is fastened in the piston head extension 112. The Bowden wire casing is fastened through a bracket 122 to the flange of the frame 3. The other end of the Bowden wire carries a lost motion linkage 123 in which is adapted to slide a pin 124 that is attached to an upright 125. The upright 125 is carried by a latch member 126 having a sloping face 127. The latch member 126 is mounted in a casing 128. The latch carries a rod 129 which passes through an aperture in the head 131 of the casing 128. There is a nut 132 mounted on the end of the rod 129 which limits the downward movement of the latch 126. A spring 133 is coiled around the rod 129 and holds the latch 126 spring pressed in the downward position, as indicated in Figure 9.

By pulling the handle 109 outwardly from the dash, the latch 126 can be pulled by means of the Bowden wire 120 into the up position to release the mechanism for lifting the weight on the steering wheels. It is to be noted that when the handle 109 is pulled outwardly, suction pipe 102 is placed in communication with suction pipe 89, which causes suction on the piston 83 so that piston 83 will be moved into the position shown in Figure 7. This is the position in which the lifting device is in full operation. In other words, upon movement of the valve to bring the device into operation, the latch 126 is raised in the up position, releasing the ports for their operation, as will later be described.

On the end of the piston rod 84 is pivoted a roller 135 which is mounted between bifurcated arms 136 attached to the end of the piston rod 84. The roller 135 is adapted to travel on a level base member 137 which is adapted to take thrust forces. This member 137 may be attached by bolts 138 to the under side of the upper flange on the frame 3 of the car. Pivoted on the axle 139 of the roller 135 is a link member 141 which is pivoted at 142 to an arm 143 of the bell crank lever which has another arm 144. The bell crank lever is pivoted on a shaft 145 which is mounted on a support base 146.

The support base 146 is bolted, by means of bolts 147, to the upper side of the lower flange of the frame 3. An upright stop member 148 is formed on the base 146 to prevent movement of the arm 143 of the bell crank lever beyond the position shown in Figure 7. The arm 144 of the bell crank lever is provided with a stud 149 that fits within the lost motion linkage 122 of the lever 23. The lever 23 in this construction is formed somewhat differently from that previously described in that there is a gradual bend at 151 instead of the sharp bend 29 in the form shown for instance in Figure 3. The front end 152 of the lever is pivoted to a pivot 153 mounted in a base 154, which is supported on the front axle 2 by U-bolts 155. The lever 23 has bifurcated arms and bracing construction (not shown) similar to that illustrated in Figures 1, 2, 3 and 6. The bifurcated arms I have indicated at 156 in Figure 11.

Figures 1, 2:
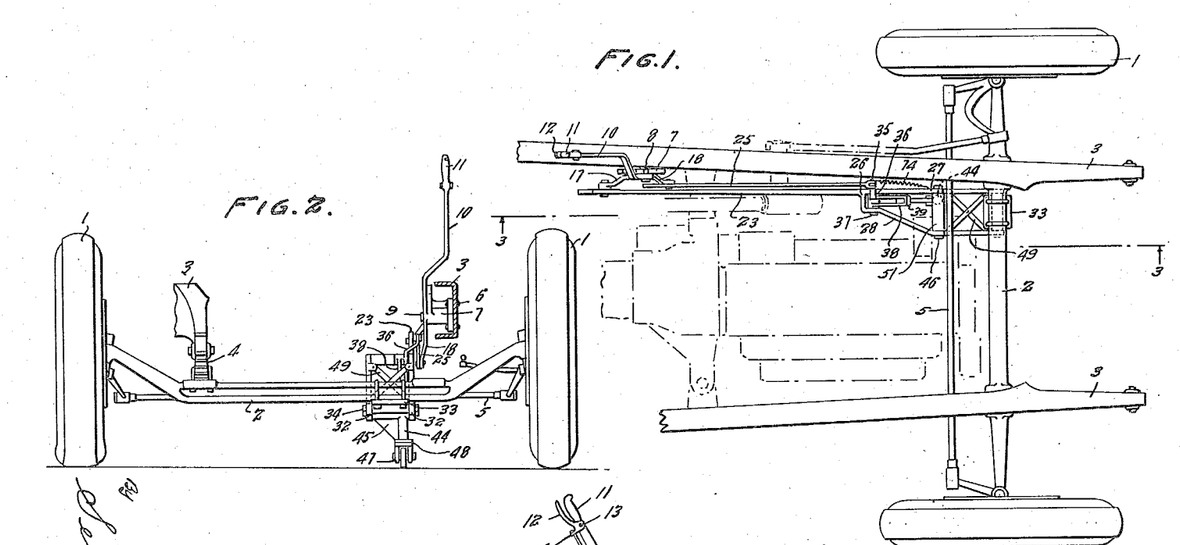
Figure 1 is a top plan view of my device applied to the chassis of an automobile, the position of the engine being indicated in dotted lines.
Figure 2 is a front elevation of my device as applied to the steering wheels of a car.
Figure 3:
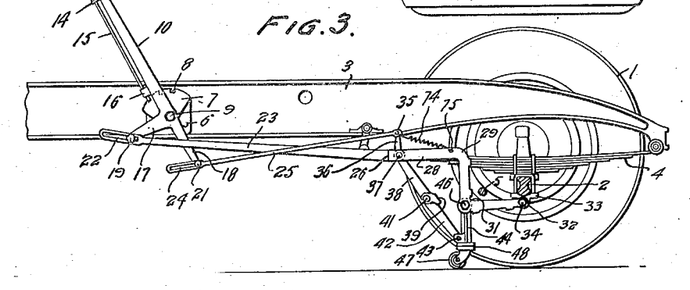
Figure 3 is a view taken along the line 3—3 of Figure 1.

There is pivoted on the pivot bolt 157 passing through the bifurcated arms 156 of the lever 23 a construction similar to the construction shown at 38 in Figure 3 which has the stop 39, the leg 42, the pivot 41 and the pivot 43, which is pivoted on the leg member 44.

Integrally formed with the bifurcated legs is an extension 158 and a spring support 159. Attached to the spring support 159 is a spring 161 which is attached to a spring support 162 attached to one of the bifurcated members 156 of the lever 23.

Pivoted on the extension 158 at 163 is a link member 164 having a lost motion slot 165. The lost motion slot passes over a stud 166 which is mounted on a base 167 attached by rivets or other suitable fastening members 168 to the frame 3 of the car. In operation the device is shown in Figure 7 in the inoperative position exerting a lifting force on one of the frame members 3 of the chassis. In this position of the parts the arm 144 of the bell crank lever is in the down position.

The piston head 83 is to the right with the parts shown in the position indicated in Figure 7. The lock stud 169 formed at the end of the arm 144 of the bell crank lever is not in engagement with the latch member 127, but has been released, and the forward motion, i. e., to the right in Figure 7 of the piston rod 84 has moved the bell crank lever to exert a downward movement on the end of the lever 23 through the connection of the stud 144 with the lost motion linkage 22 of the lever 23. This will relieve the weight on the steering wheel on that side of the vehicle where the device is located. The leg has been moved into the uncollapsed position, as indicated in Figure 7, through the contraction of the spring 161.

When the piston 83 is moved to the left, with the parts in the position shown in Figure 7, the extension 167 will be locked over the latch member 126, as plainly shown in Figure 9, which will hold the lever 23 in the up position. While it has been moved into the up position, as indicated in Figure 10, in this position the whole mechanism is latched in place, as indicated in Figure 9, and is ready to be unlatched and moved into the operative position by movement of the handle 109 on the valve mechanism 93. The operation of the valve and latch has been previously described.

In Figures 12 to 15, inclusive, I have shown another form of device in which the collapsible compression element is quite similar in structure to that shown in the form illustrated in Figure 7. The lever 23 is somewhat shorter than the lever 23 in the form shown in Figure 7. The link 164 has its lost motion slot 165 fitting over the stud 171 which is pivoted between support arms 172 that are fixed to a cylinder 173.

The cylinder 173 has a piston head 174, with the usual packing construction to make it airtight, which is adapted to slide within the interior of the cylinder 173 and to drive a piston rod 175 which carries a force transmitting member 176 which is bifurcated into two arms 177 that fit over the lost motion linkage 22 of the lever 23. A stud 178 passes through both of the bifurcated arms 177. The stud 178 is provided with an anti-friction bushing 179 which bears against the interior surfaces of the lost motion linkage slot 22. Power transmitted through the piston head 174 to the piston rod 175 is adapted to move the lever 23 to effect the upward or downward movement of the lever 23 to bring the legs 44 into the collapsed or uncollapsed condition and to relieve the weight on the steering wheel on the side of the car on which the mechanism is located. The operation of the lever and the collapsing and uncollapsing of the leg 44 has previously been described.

This form of invention is adapted to operate by oil pressure which causes the movement of the piston head 174. There is provided on the frame 3 of the car a hand lever 181 which is pivoted at 182 on a support member 183 that is bolted or riveted, as indicated at 184, to the upper flange of the frame 3 of the car. At the lower end of the lever 181 is a pivot 185 to which is attached a link 186. The link 186 is attached at 187 to a pump rod 188. The pump rod 188 passes through a packing gland 189 formed in a small cylinder 191 located at the bottom of the oil reservoir 192.

The oil reservoir 192 may be bolted, as indicated at 193, to a cover plate 194 which is bolted, as indicated at 195, to the top of the cylinder 173. In this cover plate is located a knurled and screw-threaded filling tap 196. The construction is such that the filling tap 196 does not make an airtight cover for the top of the reservoir 192. One of the walls of the reservoir 192 is thickened, as indicated at 197, and is provided with a port 198 and another port 199. In an enlarged opening 201 in the thickened portion 197 of the wall is housed a ball 202 which acts as a valve and is held in spring pressed relation by means of a spring 203 in its down position. A cover 204 is provided at the top of the opening 201 and is adapted to be screw-threaded in this opening. The spring 203 bears at its upper end against the bottom of the plug 204, and against the top of the ball 202.

The port 199 opens at its bottom into a space 205 provided at the other end of the cylindrical construction 191. Leading outwardly from this cylinder construction 191 is a port 206 which leads into an opening 207 in a valve construction 208, which is provided with a port 209. Against the bottom of the valve and closing the port 209 normally is a ball 211 which is held in position by means of a spring 212.

The piston rod 188 carries a piston head 213 which acts as a pump head for exerting pressure on oil in the system, as will be later described. There is provided a cylindrical housing 214 inside the reservoir 192 which has a central aperture 215 in which is adapted to reciprocate a rod 216 that carries a cylindrical upper port control 217 and a cylindrical lower port control 218. The rod 216 extends downwardly and passes through a lower cylinder head 219. A port 221 is provided at one end of the cylindrical opening 215, and a port 222 at the upper end of the opening. There are also provided slanted ports 223 and 224 which pass through the wall of the cylinder and permit ingress and egress of oil to either side of the piston head 174. The piston rod 175 is provided with the usual packing gland construction, indicated generally by the numeral 225.

The rod 216 has its upper portion of reduced diameter, as indicated at 226, and passes through an aperture provided in the upstanding extension 227 provided in the member 194. This portion 226 of the rod 216 is attached to a Bowden wire 228 provided with a casing 229. The Bowden wire is operated by means of a push-pull-rod 231 mounted on the dash and provided with a handle 232. There is a housing 234 provided at the bottom of the cylinder head 219 which has an aperture 235 in which is adapted to slide a cam member 236. The cam member 236 passes through an aperture 237 provided in a latch member 238.

Figures 14, 15:
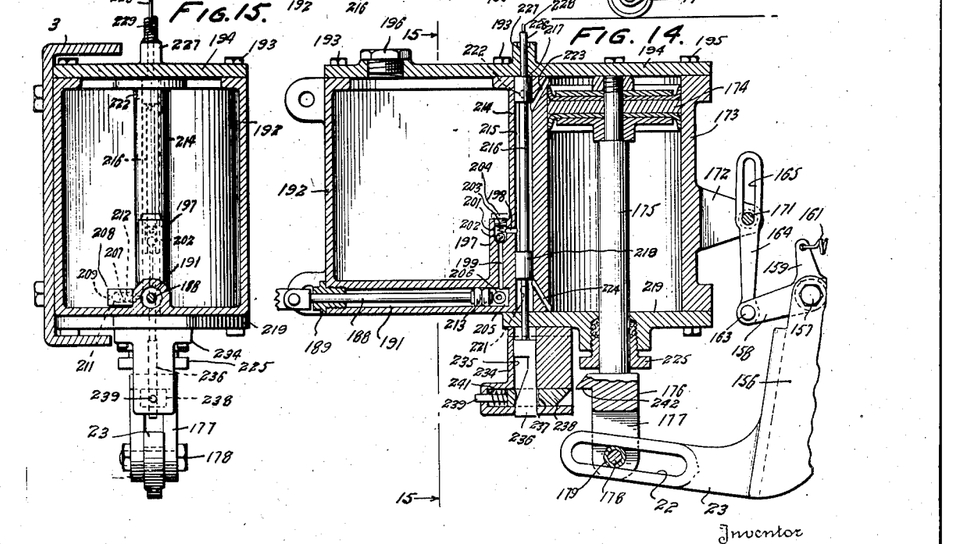
Figure 14 is a view taken along the line 14—14 of Figure 13, looking in the direction of the arrows.
Figure 15 is a view taken along the line 15—15 of Figure 14, looking in the direction of the arrows.
Figure 16:
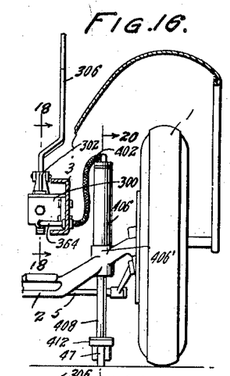
Figure 16 is a front elevation of another form of my device in which fluid is used to expand the length of the compression element.

The latch member 238 is provided with a guide extension 239 which passes through an aperture in an extension of the housing 234. A coil spring 241 surrounds the extension 239 and urges the latch member towards the right with the parts shown in the position indicated in Figure 14. The latch member is adapted to engage with an extension 242 provided on the member 176 in its extended position. With the parts shown as indicated in Figure 14, the latch 238 is in the withdrawn position, permitting the operation of the piston 174 downwardly to effect the lifting of the part of the car on which the device is located.

The pump handle 181 can be operated to cause the piston 213 to reciprocate in the cylindrical opening 191. When the piston 213 moves to the left with the parts in the position shown in Figure 14, oil is sucked out of the reservoir 192 and into the cylindrical opening 191 through the port 209, lifting the ball 211 against the pressure of the spring 212. The oil passes then through the port 206 and into the cylindrical opening 191. The piston head 213 may now be moved to the right with the parts in the position shown in Figure 14, which forces the oil through the duct 199, the ball 211 preventing passage of the oil backward in the direction from which it came. The pressure of the oil in duct or port 199 raises the ball 202 against the pressure of the spring above it and causes the oil to pass through the port 190 into the cylindrical opening 215 and thence through port 223 to the space above the piston 174 in the cylinder 173. This forces downward the piston rod 175 and hence the lever 23, with the consequent uncollapsing of the leg 44 and the raising of that portion of the vehicle upon which the device is located.

Let us assume that the piston head is moved into the down position, the oil on the lower side of the piston head 174 has been ejected through port 224 and through port 221 back into the reservoir 192.

Let us assume that we wish to bring the compression element into the collapsed condition. This is accomplished by raising the lever 23 back into the position indicated in Figure 14; and further, let us assume that we wish to lock the compression element into its upper collapsed condition. In this case, the handle 232 is pushed inwardly towards the dash, which moves downwardly rod 216, causing cylindrical member 218 to cover port 221 while leaving open port 224. Ports 223 and 222 are opened by movement of the cylinder member 217. The oil under pressure in cylindrical member 215 then forces another port 224 into the confined space below the piston head 174 and raises the piston. The oil above the piston head passes through port 223 and through port 222 back into the oil reservoir 192.

The cam 236 will be in the down position, which will permit the spring 241 to push forward the latch 238 so that it will engage the under side of the extension 242 in the member 176 and hold the compression element in its upper collapsed condition until the handle 232 on the dash is pulled outwardly to unlatch the mechanism and permit the cycle to be repeated.

In Figures 16 to 20, inclusive, I have shown another form of device in which fluid pressure, preferably of oil, is used to extend or retract a piston rod. In this form of device the pump is adjusted to operate for rapid movement of the elevating mechanism until the stages of the actual lift start, in which case more power but less rapidity of movement is achieved through mechanism about to be described.

Mounted on the frame 3 of the car is a pump casing 300, which is suitably attached by bolts 301, or otherwise, to the framework 3. On the pump casing 300 is an upstanding support member 302 which supports a pivot 303 to which is pivoted a link 304 which is pivoted at its other end, as indicated at 305, to a hand lever 306. The hand lever 306 is provided with a bifurcated end 307 to which is pivoted at 308 a piston rod 309. The piston rod passes through a conventional packing gland 310 in a cylinder head 311 which is suitably secured in a cylinder 312. The piston rod 309 carries a piston 313 which makes a fluid tight fit with the interior of the cylinder 312.

The cylinder 312 is open at one end and the piston rod 309 has an enlarged portion 314 which passes through a packing gland 315 into a cylinder 316, approximately the same diameter as the enlarged portion 314 of the piston rod. The lower side of the cylinder 312 has a port 317 and a ball valve 318 which is spring pressed in the up position by means of the spring 319 which is held in place by a knurled screw-tap 321 which closes an aperture 322 formed in an extension 323 of the lower wall of the cylinder 312. In this lower wall of the cylinder 312 is a port 324 which communicates with an aperture 325 in which is located a valve operating rod 326.

The valve operating rod 326 has a conical valve head 327 which is adapted to seat in a valve seat 328. The lower end of the rod 326 slides in an aperture 329 formed in a knurled screw-tap 331 which is secured within the extension 332 of the lower cylinder wall.

Adapted to bear against the top of the rod 326 is an operating arm 333 which is pivoted at 334 against the inner side wall of the casing 300. The casing 300 is provided with a cover 335 held in place by suitable bolts 336. Passing through the casing is a valve operating rod 337 provided with an enlarged head 338. The valve operating rod 337 passes through the cover 335 and touches the operating arm 333.

Communicating with the cylindrical aperture 316 is a duct 339 which opens at its lower end into an enlarged chamber 341. A ball 342 is adapted to bear against a conical seat formed in the enlarged chamber 341. The ball 342 is held in the up position by a spring 343 which is supported at its bottom by a knurled screw-threaded tap 344 that fits in an extension 345 formed at the bottom of the casing 300. From the duct 339 is a member 346 which leads to an enlarged chamber 347 in which is a spring 348 that bears against a ball 349 which seats in a conical seat formed in a knurled screw-threaded tap 351 which is screwed into an extension 352 of a support 353 of which the cylinder 316 is a part. There is a knurled screw-threaded tap 354 located in the top plate 335 of the casing 300, and the casing 300 and the top plate 335 form a reservoir for oil, a space, as indicated by the numeral 355, being filled with oil. The reservoir does not have to be airtight.

In order to move the valve operating rod I have shown a bell crank lever which has one arm bearing against the enlarged head 338, the bell crank lever I have indicated by the numeral 356. It is pivoted at 357 on the front floor board of the car, and is provided with a foot engaging member 358 which will permit the bell crank lever to be pushed forward by the foot to push downwardly on the valve operating rod 337 in order to release the conical valve member 327 from its seat, thus permitting passage of oil from the aperture 325 into the reservoir 355.

The aperture 325 communicates with a duct 360 which communicates with an aperture 361 that communicates with a duct 339 and with a duct 362 to which is fitted, as indicated at 363, a pipe 364 which communicates with the lift device for the car.

The purpose of the construction above described is to permit a considerable quantity of fluid, such as oil, to be ejected through the pipe 364 in the first part of the movement of the lift device,—in other words, until it becomes necessary to apply considerable power to actually effect the lift where the device is in contact with the ground.

There is provided a valve mechanism at 365 which communicates with the interior of the cylinder 312 and with the reservoir 355. This comprises an extension 366 formed on the cylinder wall, and communicating with the cylinder through a duct 367. In the extension 366 is an enlarged aperture 368 in which there is a spring 369 which presses a ball 370 against a conical seat provided in a knurled screw-threaded tap 371 which has a port 372 permitting flow of oil from the reservoir 355 through the port 372 and past the ball 370 into the port 367 and into the interior of the cylinder 312.

Figure 17:
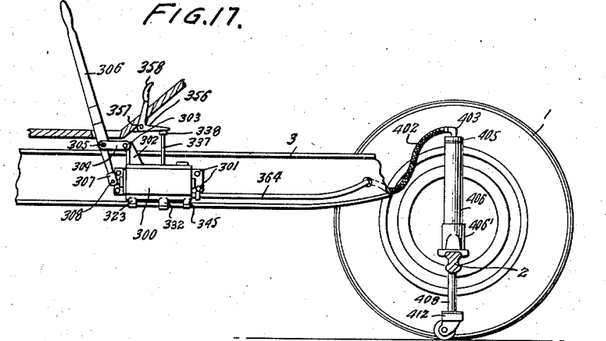
Figure 17 is a side elevation of the form of device shown in Figure 16.
Figures 18, 19, 20:
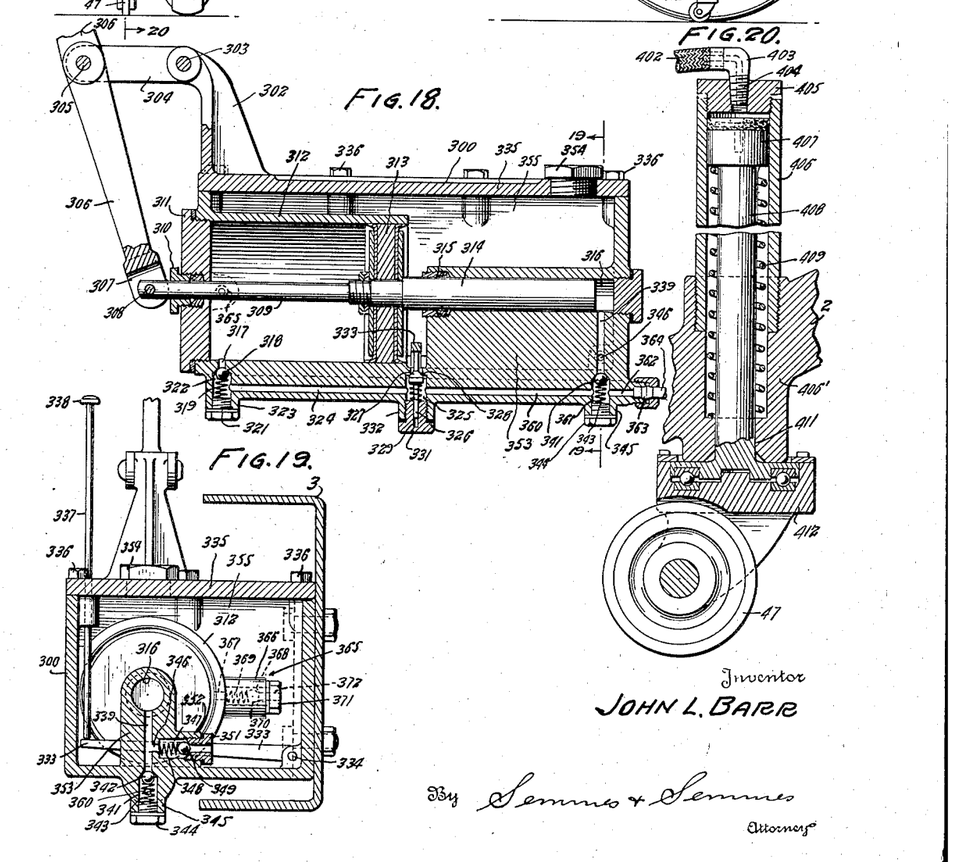
Figure 18 is a view taken along the line 18—18 of Figure 16, looking in the direction of the arrows.
Figure 19 is a view taken along the line 19—19 of Figure 18, looking in the direction of the arrows.
Figure 20 is a view taken along the line 20—20 of Figure 16, looking in the direction of the arrows.

Let us assume that the handle 306 is reciprocated to the right in Fig. 17. This will reciprocate the piston head 313 to the left, viewing the parts from the position from which Fig. 18 was taken. In the position of the parts shown in Figure 18, movement of the piston head from the left to the extreme right position, as shown, has caused oil to be sucked from the reservoir 355 through the valve 365, past the ball 370, through the port 367 into the interior of the cylinder 312, filling the cylinder. Upon reciprocation in the opposite direction, one which moves the cylinder head 313 to the left with the parts shown in the position in which they are indicated in Figure 18, oil is forced through the port 317, pushing downwardly the ball 318 through duct 324, into the aperture 325, into duct 360, into aperture 361, through duct 362, into the pipe 364. This oil is not under high pressure because of the relatively large size of the piston head 313. This charge of oil is regulated to give a reduced downward movement to the roller 47 until it touches the roadway.

The enlarged section 314 of the piston rod 309 is a high pressure pump mechanism sucking oil through the one way valve 346 into the cylinder 316, and ejecting it through the duct 339 past the ball 341 in the one way valve into the duct 362 and out into the pipe 364. It is to be realized that this high pressure pump will deliver oil at high pressure on movement of the handle 306 in the opposite direction. Thus, very high pressures can be generated in the pipe line 364. The high pressure charge is regulated in volume to give the necessary lift to the vehicle body after roller 47 is in contact with the ground.

This pipe line 364 communicates with a flexible coupling pipe 402 which has a fitting 403 at its end which is screw-threaded at 404 into the cylinder head 405 on a cylinder 406. The cylinder 406 is mounted on a suitable fitting 406' formed on the axle 2. Reciprocating within this cylinder 406 is a piston head 407 carried by a piston rod 408. Surrounding the piston rod 408 is a compression spring 409 whose upper end rests against the lower end of the piston head 407, and whose lower end rests against the bottom of the cylinder. The compression spring will return the piston head 407 to the up position discharging the oil back into reservoir when the operator desires. The spring 409 is assisted of course for at least part of the movement by the weight of the car.

To permit the oil to flow back out of the cylinder 406 and into the reservoir 355, the operator exerts pressure on the foot pedal 358. This pressure will cause the bell crank lever to push downwardly on the valve operating rod 337, which will push downward on the rod 326 and lower the conical valve 327 to permit ready flow of oil from the cylinder 406 under pressure of the spring 409 back past the conical valve 327 and into the reservoir 355.

The piston rod 408 extends outwardly through an aperture 411 in the bottom of the cylinder construction and carries a ball race and caster construction 412 similar to that previously described in connection with Figure 6. The cylinder 406 may be made relatively short and screw-threaded, as indicated at 413, into the fitting 406' which forms a continuation of the cylinder. This is readily apparent from Figure 20.

In the first part of the operation for relieving the weight on at least one of the steering wheels, the hand lever 306 is reciprocated to pump oil into the cylinder 406 to push downwardly the piston 408 until the caster 47 engages the roadway. Reciprocation of the hand lever 306 in the opposite direction brings the high pressure pump into operation to give the actual lift. To lower the vehicle the foot pedal 358 is stepped upon by the operator which opens the valve 327 and the spring 409 aided by the weight of the car returns the oil therein to the reservoir 355.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a device of the character described, a collapsible compression element adapted to engage the road comprising a lever pivoted on the front axle of the vehicle, a ground engaging leg pivoted to the lever, means to move the lever and leg relative to each other to bring the compression element into the uncollapsed condition and additional means to move said element downwardly only after it has reached its uncollapsed state to relieve the weight on at least one of the steering wheels of the vehicle.

2. In a device of the character described, a collapsible compression element adapted to engage the road, a lever pivoted on the front axle of the vehicle, a ground engaging leg pivoted to the lever, a hand lever, an operating rod, lost motion connections connecting the operating rod and said first-mentioned lever to the hand lever, said operating rod being connected to the leg.

3. In a device of the character described, a collapsible compression element adapted to engage the road comprising a lever pivoted on the front axle of the vehicle, a ground engaging leg pivoted to the lever, a hand lever, an operating rod, lost motion connections connecting the operating rod and said first-mentioned lever to the hand lever, said operating rod being connected to the leg, and spring means tensioning said compression element into the uncollapsed condition.

4. In a device of the character described, a collapsible compression element adapted to engage the road comprising a lever pivoted on the front axle of the vehicle, a ground engaging leg pivoted to the lever, means to move the lever and leg relative to each other to bring the compression element into the uncollapsed condition, means to swing the uncollapsed element downwardly to relieve the weight at least in part on at least one of the steering wheels of the vehicle, and a caster attachment for the bottom of the compression element.

5. In a device of the character described, a collapsible compression element adapted to engage the road comprising a lever pivoted on the front axle of the vehicle, a ground engaging leg pivoted to the lever, a hand lever, an operating rod, lost motion connections connecting the operating rod and said first-mentioned lever to the hand lever, said operating rod being connected to the ground engaging leg, and a caster attachment for the bottom of the compression element.

JOHN L. BARR.